United States Patent [19]

Stemme et al.

[11] 4,297,027
[45] Oct. 27, 1981

[54] APPARATUS FOR EXPOSING AND DEVELOPING PHOTOSENSITIVE MATERIAL

[75] Inventors: Otto Stemme, Munich; Berthold Fergg; Viktor Osegowitsch, both of Taufkirchen; Wolfgang Viehrig, Munich, all of Fed. Rep. of Germany

[73] Assignee: Agfa-Gevaert AG, Leverkusen, Fed. Rep. of Germany

[21] Appl. No.: 97,720

[22] Filed: Nov. 27, 1979

[30] Foreign Application Priority Data

Nov. 30, 1978 [DE] Fed. Rep. of Germany ....... 2851893

[51] Int. Cl.³ .................... G03B 27/32; G03B 27/52
[52] U.S. Cl. ..................................... 355/27; 355/100; 355/106
[58] Field of Search .................. 355/100, 106, 27, 28, 355/21, 54

[56] References Cited

U.S. PATENT DOCUMENTS

| 3,308,717 | 3/1967 | Okishima et al. | 355/28 |
| 3,746,444 | 7/1973 | Kahle et al. | 355/54 X |
| 3,779,641 | 12/1973 | Hauck | 355/28 X |
| 4,066,354 | 1/1978 | Igarashi et al. | 355/28 |
| 4,076,412 | 2/1978 | Igarashi et al. | 355/28 |
| 4,135,809 | 1/1979 | Ponce | 355/27 |

Primary Examiner—Richard A. Wintercorn
Attorney, Agent, or Firm—Peter K. Kontler

[57] ABSTRACT

A combined exposing and developing apparatus for film units wherein a negative sheet overlaps and extends beyond a positive sheet has an exposing unit in which the uppermost film unit of a stack of such units in a cassette is exposed to light. The developing unit has a casing which is adjacent to a compartment for cassettes and has two advancing rolls which pinch the leader of the negative sheet of a freshly exposed film unit in response to manual pivoting of a carriage for the advancing rolls by way of a rotary knob. The leader of the negative sheet is automatically separated from the positive sheet by a separating device in response to rotation of the knob before the two sheets advance through separate channels which are filled with a developing liquid. The sheets are thereupon reunited and moved into the nip of two squeezing rolls which are driven by the knob and wipe off the surplus of developing liquid before the reassembled film unit enters a diffusion chamber below the compartment for cassettes. Such film unit is removed from the diffusion chamber after a certain period of dwell therein, and the operator thereupon separates the positive and negative sheets of the fully developed film unit from each other.

20 Claims, 3 Drawing Figures

APPARATUS FOR EXPOSING AND DEVELOPING PHOTOSENSITIVE MATERIAL

BACKGROUND OF THE INVENTION

The present invention relates to apparatus for exposing and developing photosensitive material, and more particularly to improvements in apparatus for exposing and developing so-called film units each of which comprises several sheet-like constituents and wherein the constituents of a film unit must be separated from each other during a certain stage of the developing operation.

As a rule, apparatus for exposing film units comprise a light source, a set of color filters, a platform which supports the original during imaging onto a film unit, and an adjustable optical system which images the original onto a film unit. The developing unit for the exposed film units is normally remote from the exposing means.

U.S. Pat. No. 3,308,717 granted Mar. 14, 1967 to Okishima et al. discloses an apparatus wherein the exposing and developing units are assembled in a common housing. The photosensitive material is furnished in the form of a roll of photographic paper, and such paper is fed directly into the developing unit as soon as it leaves the exposing station. The developing unit includes several vessels each of which contains a different developing liquid. A drawback of the patented apparatus is that it occupies too much space. This is especially undesirable when the apparatus is to be used in a private home, e.g., by an amateur who desires to make his own enlarged prints of color photographic films. Moreover, the means for transporting the photosensitive material through the developing unit is complex and expensive. Still further, the number of liquid baths is substantial, and the photographer must ensure that each and every section of the exposed photographic paper remains in each of the baths for a different predetermined interval of time.

OBJECTS AND SUMMARY OF THE INVENTION

An object of the invention is to provide a novel and improved apparatus for the exposure and development of photographic material, especially for the exposure and development of so-called film units each of which is assembled of several sheet-like components and the components of each film unit are separable from each other.

Another object of the invention is to provide an apparatus which occupies less room than heretofore known apparatus and which can be used with advantage in private homes.

A further object of the invention is to provide an apparatus whose manipulation is not dangerous to the operator because the part or parts which contain liquids (such as developing agents) need not contain any electrical components.

An additional object of the invention is to provide a novel and improved developing unit for use in an apparatus of the above outlined character.

Another object of the invention is to provide the developing unit with novel and improved means for transporting film units therethrough.

A further object of the invention is to provide the apparatus with novel and improved means for completing the treatment of successive film units subsequent to removal or expulsion of such units from a liquid bath.

Another object of the invention is to provide a compact and inexpensive photographic laboratory which can be used by private individuals in their homes and is sufficiently simple to be readily manipulated by persons having relatively little skill.

A further object of the invention is to provide the apparatus with novel and improved means for separating and thereupon reuniting the sheet-like constituents of successive film units in the course of the developing treatment.

The apparatus of the present invention can be used to expose and develop film units wherein two sheets overlap each other and a marginal portion of one of the sheets preferably extends beyond the corresponding marginal portion of the other sheet so that the projecting marginal portion of the one sheet constitutes a leader of the film unit. Such film units can be used for the making of enlargements of exposed and developed film frames, and the exposed film units are thereupon subjected to a developing treatment, preferably a treatment which includes the dwell of a film unit (which has been contacted with a liquid developing agent) in a diffusion chamber.

The improved apparatus comprises an exposing unit including means (e.g., a cassette which is insertable into a compartment forming part of the housing of the apparatus) for supporting successive film units in a predetermined plane during exposure of such film units to light, and a developing unit which includes advancing means (e.g., two pairs of substantially parallel rolls which can be driven in such a way that their peripheral speeds are identical), a carriage wherein at least a portion (preferably one pair of advancing rolls) of the advancing means is mounted, means (e.g., a manually rotatable knob) for moving the carriage between a first position in which the advancing means can engage the leader of a film unit which is located in the predetermined plane and a second position in which the thus engaged film unit (such unit is already exposed) is at least partly withdrawn from the predetermined plane, and a vessel containing a supply of liquid developing agent and being adjacent to the aforementioned portion of the advancing means in the second position of the carriage. The latter can comprise one or more levers which are pivotable about a fixed axis, preferably about the axis of a further roll which forms part of the advancing means.

The exposing unit preferably further comprises a light source in front of a reflector, a platform or an analogous support for the originals which are to be imaged onto successive film units (such platform is located between the light source and the aforementioned plane for the film units) and adjustable optical means for focusing the images of originals in or on the platform onto the film units in the predetermined plane. Still further, the exposing unit can comprise filter means for light which issues from the source and passes through an original (e.g., a film frame) in or on the platform prior to impinging upon the film unit in the predetermined plane.

The apparatus further comprises a diffusion chamber, and the advancing means preferably comprises means for transporting successive film units through and beyond the supply of liquid developing agent in the vessel and into the diffusion chamber.

The apparatus further comprises a housing including a first casing for the component parts of the exposing unit, a compartment which is located below the first casing and serves to receive discrete film units or cassette containing stacks of film units, and a second casing for the developing unit. A portion of the second casing preferably extends to a level below the compartment and is flush or practically flush with one end of the aforementioned diffusion chamber.

The developing unit further comprises means for separating the sheets of a film unit during transport through the supply of developing agent, and the advancing means preferably comprises a pair of rolls which are adjacent to an opening for admission of film units into the diffusion chamber and serve to remove the surplus of developing agent. Such surplus is intercepted by a second vessel which is adjacent to the first mentioned vessel and is disposed below the rolls for removal of surplus agent.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
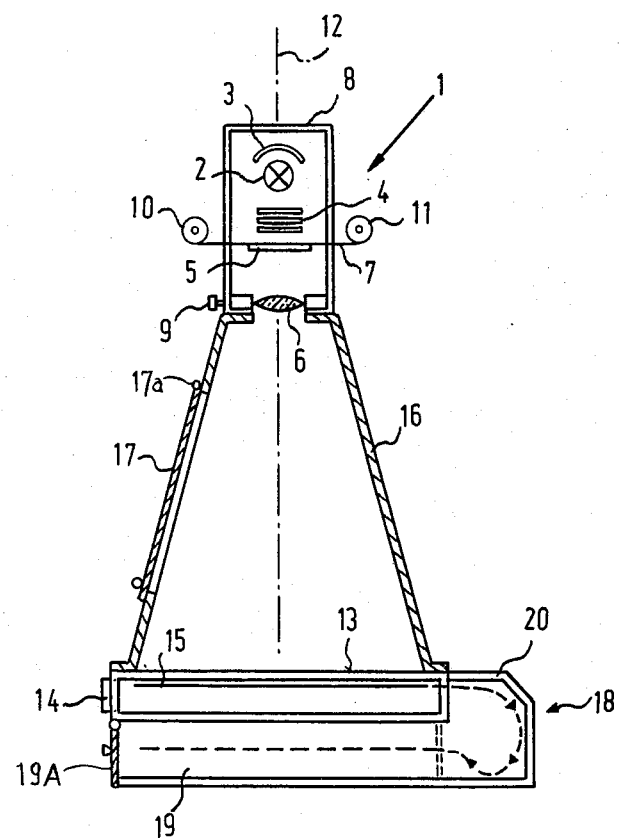
FIG. 1 is a somewhat schematic vertical sectional view of an apparatus which includes an exposing unit and a developing unit embodying our invention.

FIG. 1 shows an apparatus which includes an exposing unit 1 with a light source 2, a reflector 3 behind the light source 2, a system of color filters 4 in front of (below) the light source 2, a platform 5 or an analogous support for the originals to be copied, and an adjustable (variable-focus) optical system 6. The components 2 to 6 are installed in a first casing 8 which forms part of a composite housing. A rotary knob 9 which serves as a means for adjusting the optical system 6 is accessible at the outer side of the first casing 8. The casing 8 further supports the spindles for a supply reel 10 and a takeup reel 11. These reels carry a supply of photographic film 7 or other means carrying a series of originals, some or all of which are to be imaged onto photosensitive material. Successive frames of the film 7 can be placed into register with the optical system 6 by advancing the film from the supply reel 10 toward the takeup reel 11 whereby the selected frame of the film 7 overlies the platform 5. It is clear that the apparatus which is shown in FIG. 1 can be designed to accept a single original at a time, i.e., to accept discrete photographic film frames which are placed, in selected order, onto the platform 5. The means for transporting the film 7 with reference to the platform 5 is not specifically shown in the drawing.

The reference character 12 denotes the optical axis of the system 6. This optical axis extends at right angles to the plane of the uppermost or outermost film unit 15 in a cassette or container 14 which can be inserted into a compartment 13 at a level below the casing 8 so that the cassette supports the uppermost film unit 15 in a predetermined plane. The compartment 13 also constitutes a constituent of the composite housing which includes the first casing 8 and which further includes a relatively small second casing 20 for a developing unit 18 which is adjacent to one side of the container 13. As disclosed in the commonly owned copending application Ser. No. 97,719 of Berthold Fergg et al. (filed Nov. 27, 1979 for "Cassette for film uits"), the cassette 14 in the compartment 13 can store a stack of discrete film units 15, each of which includes a longer negative sheet 15a and a shorter positive sheet 15b. The application of Fergg et al. further discloses manually actuatable (extractible) removing elements which are used to partially withdraw successive film units 15 from the cassette 14 and to introduce such units into the casing 20 of the developing unit 18. It is clear that, if the manufacturer desires to greatly simplify the construction of the apparatus, the compartment 13 can be replaced with a horizontal slot for supporting one film unit 15 at a time in a predetermined plane, and such film units can be fed seriatim to a position of register with the optical system 6 so as to receive an image of the original which overlies the platform 5.

The aforementioned composite housing further comprises a downwardly diverging, substantially tubular light duct 16 which is disposed between the first casing 8 and the compartment 13 and serves to direct light, which has penetrated through the original on the platform 5 and through the platform 5, toward the topmost film unit 15 in the compartment 13. The casing 8 is or can be mounted directly on top of the duct 16. This duct has a door 17 which can be pivoted to open position (see the hinge 17a) in order to enable the operator to observe the image of the original (overlying the platform 5) on a white plate above the topmost film unit 15 in the cassette 14 or on a white cover sheet which is installed in and is retractible from the cassette 14. Reference may be had to the aforementioned copending application Ser. No. 97,719 of Fergg et al. which fully discloses the manner of assembling a stack of film units with one or more cover sheets, enabling an operator to make "test exposures", i.e., to focus the image of an original on the cover sheet overlying the uppermost film unit 15 prior to actual exposure of such uppermost film unit to copying light. The adjustment is carried out by rotating the knob 9 while the door 17 is open and the operator observes the aforementioned white plate or cover sheet in or close to the top portion of the compartment 13. The plate or the cover sheet is thereupon removed (subsequent to extinguishment of the light source 2) and the unit 1 is ready to expose the image of an original on the platform 5 onto the uppermost film unit 15 in the cassette 14. The door 17 is closed during exposure of film units 15 to copying light.

Figure 2:
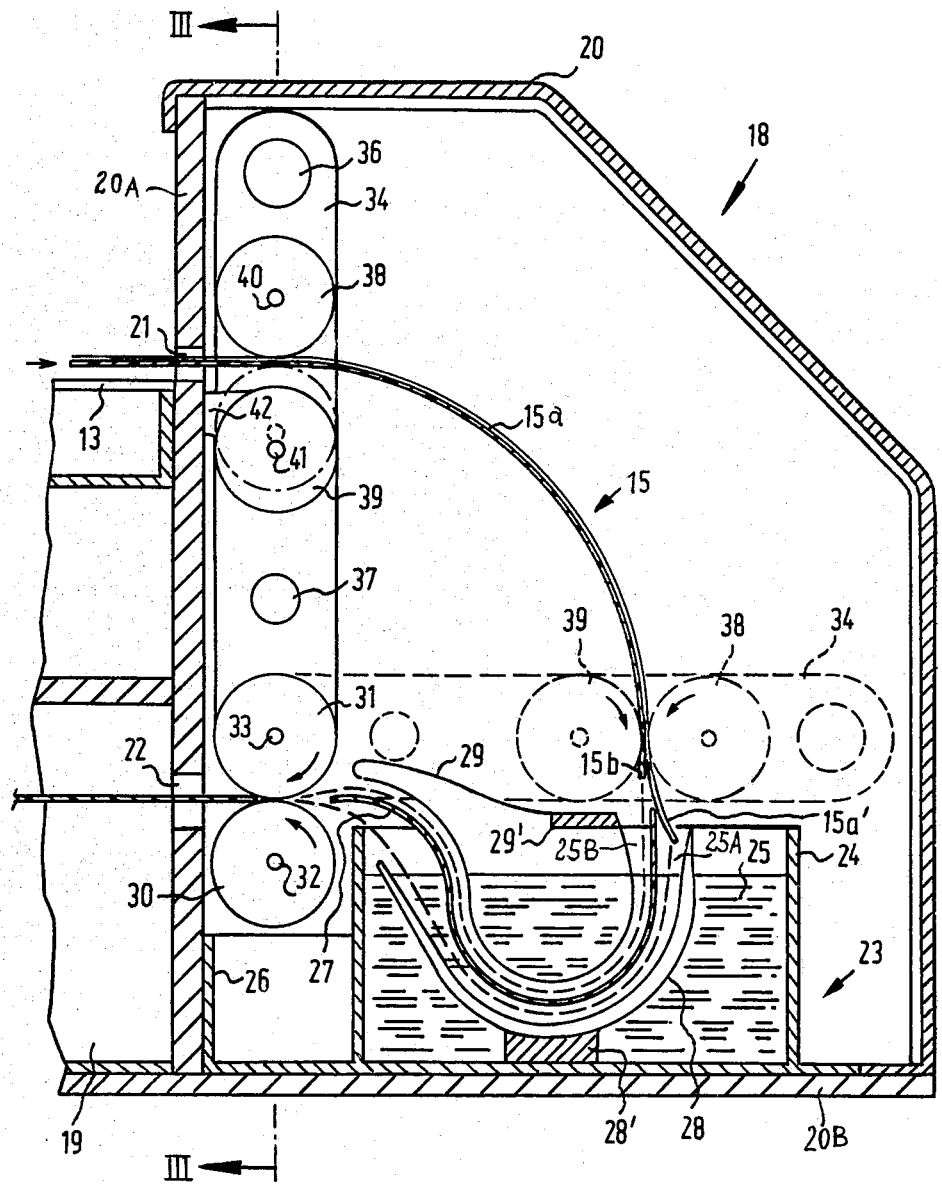
FIG. 2 is an enlarged vertical sectional view of the developing unit.

The developing unit 18 is adjacent to one side of the cassette 13 and its casing 20 is relatively small. The arrangement is such that a freshly exposed film unit 15 is transferred from the cassette 14 (in the compartment 13) into the casing 20, and the developed film unit 15 is thereupon transferred from the casing 20 into a diffusion chamber 19 which is located at a level below the compartment 13. This feature is claimed in our commonly owned copending application Serial No. 96,742 filed Nov. 23, 1979. The just mentioned copending application discloses and claims (and FIG. 1 of the present application clearly shows) that the entire diffusion chamber 19 is located below the compartment 13. FIGS. 1 and 2 further show that a portion of the casing 20 for the developing unit 18 extends or can extend to a level below the compartment 13 so as to allow for more convenient transfer of liquid-treated film units 15 from the casing 20 into the chamber 19. At any rate, the major part of (if not the entire) developing unit 18 is installed in a relatively small casing 20 whose height equals or approximates the combined height of the compartment 13 and diffusion chamber 19. As shown in FIG. 1 by a broken line, the path for the transport of film units 15 from the cassette 14 in the compartment 13 into the developing unit 18 and thence into the diffusion chamber 19 is a substantially U-shaped path with horizontal or nearly horizontal legs and an arcuate web which latter is located in the casing 20. The direction in which a film unit 15 moves from the predetermined plane defined by the cassette 14 in the compartment 13 is counter to the direction in which the sheets of such film units move through a supply of liquid developing agent in the interior of the casing 20.

Figure 3:
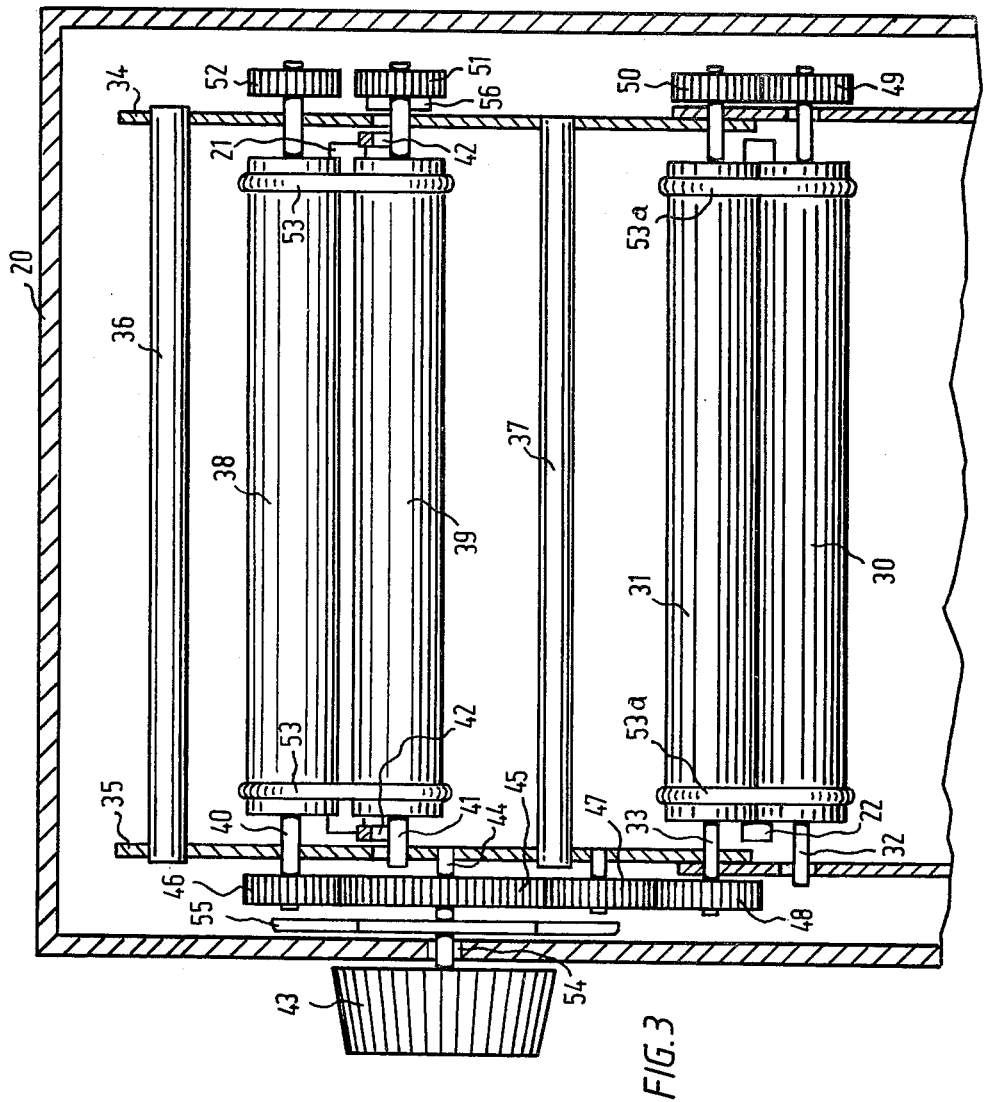
FIG. 3 is a fragmentary sectional view as seen in the direction of arrows from the line III—III of FIG. 2.

The details of the developing unit 18 in the casing 20 are shown in FIGS. 2 and 3. The casing 20 is immediately adjacent to the compartment 13, and its left-hand wall 20A (as viewed in FIG. 2) has a first elongated horizontal slit-shaped opening 21 which is in line with the leader of the topmost film unit 15 in the cassette 14 and extends at right angles to the plane of FIG. 2. The opening 21 serves to permit entry of film units 15 into the casing 20. A second elongated slit-shaped opening 22 which also extends at right angles to the plane of FIG. 2 is formed in the wall 20A at a level below the opening 21 and serves to permit liquid-treated film units 15 to leave the casing 20 and to enter the diffusion chamber 19 wherein the treatment of such film units 15 is completed.

The detachable bottom wall 20B of the casing 20 supports a preferably removable frame 23 which carries or is made integral with a first vessel 24 for a supply of liquid developing agent 25 and an intercepting and collecting container or vessel 26 for liquid developing agent which is to be removed from a film unit 15 before the latter enters the diffusion chamber 19. The vessel 24 contains a suitably configurated separating device 27 for the sheets 15a and 15b of a film unit 15 which has entered the casing 20 via opening 21. The separating device 27 consists of metallic sheet material and has an arcuate shape so that it can direct the two sheets 15a, 15b of an oncoming film unit 15 into two discrete channels 25A and 25B located at the opposite sides of the device 27. The device 27 is preferably mounted in or on the vessel 24, so that it can be removed from the casing 20 in response to removal of the frame 23. In the illustrated embodiment, the two edge faces of the separating device 27 are secured to the corresponding upstanding walls of the vessel 24.

The separating device 27 is flanked by two guide elements 28 and 29 which constitute ribs extending from transverse strips 28', 29' secured to or made integral with the vessel 24. The aforementioned channels 25A and 25B are respectively defined by the device 27 with the guide elements 28 and 29. The channel 25A serves for the passage of the longer negative sheet 15a, and the channel 25B serves for the passage of the shorter positive sheet 15b of that film unit 15 which has been caused to enter the casing 20. The sheets 15a and 15b meet again prior to entering the opening 22 on their way into the diffusion chamber 19. The two sheets are introduced into the nip of two parallel sheet-advancing and liquid removing rolls 30, 31 prior to entering the opening 22 whereby the rolls 30, 31 remove the surplus of liquid developing agent and such surplus descends into the vessel 26 therebelow. The axes of the shafts 32, 33 for the advancing and removing rolls 30, 31 are normal to the direction of forward movement of film units 15 and of their sheets 15a, 15b along the aforementioned U-shaped path and such shafts are parallel to the longitudinal directions of the openings 21 and 22.

The shaft 33 for the upper advancing and liquid removing roll 31 supports two levers 34, 35 (see also FIG. 3) which are connected to each other by several transverse coupling rods or bars (the drawing shows two bars or rods 36, 37). The carriage, including the levers 34, 35 and bars or rods 36, 37, is pivotable about the axis of the shaft 33 through an angle of approximately 90 degrees, namely, between a first end position which is shown in FIG. 2 by solid lines and a second end position which is indicated in FIG. 2 by broken lines. In the first end position, the levers 34, 35 are substantially vertical, and such levers are substantially horizontal in the second end position of the carriage 34–37. The purpose of the carriage 34–37 is to support two additional parallel advancing rolls 38, 39 which are respectively mounted on horizontal shafts 40, 41. The shaft 41 is movable sideways so as to enable the advancing roll 39 to move toward or away from the advancing roll 38. The end portions of the shaft 40 for the advancing roll 38 are fixedly mounted in the respective levers 34, 35. The casing 20 supports two disengaging cams 42 which are adjacent to the path of movement of the advancing roll 39 to the solid-line position of FIG. 2 and automatically move the roll 39 downwardly and away from the roll 38 when the carriage 34–37 reaches the solid-line (first end) position of FIG. 2. The width of the gap between the rolls 38, 39 is then sufficient to allow for unimpeded entry of the leader 15a' of a film unit 15 into the casing 20, i.e., into the developing unit 18.

The means for driving various mobile components of the developing unit 18 is illustrated in FIG. 3. A rotary knob or handwheel 43 is mounted at the exterior of the casing 20, and its shaft 44 extends through an arcuate slot 54 of the casing 20. The shaft 44 is journalled in the lever 35 and is connected with a gear 45 in mesh with a gear 46 on the shaft 40 of the advancing roll 38 as well as with an intermediate gear 47 which can drive a gear 48 on the shaft 33 for the roll 31. The lever 34 is inwardly adjacent to two additional pairs of gears 49, 50 and 51, 52. The gears 49, 50 are in mesh and are respectively mounted on and rotate with the shafts 32, 33. The purpose of these gears is to synchronize the angular movements of the roll 30 with those of the roll 31. The gears 51 and 52 are respectively mounted on the shafts 41, 40 and are in mesh only when the shaft 41 for the roll 39 is not in engagement with the faces of the disengaging cams 42. FIG. 3 shows that the gears 51, 52 are out of mesh because the gap between the advancing rolls 38, 39 is wide, i.e., because the roll 39 is held away from the roll 38. The reference characters 53 denote two endless coil springs which surround the end portions of the rolls 38, 39 and permanently urge the roll 39 toward the roll 38, i.e., the width of the gap between the rolls 38, 39 is automatically reduced to zero as soon as the shaft 41 is moved away from the surfaces of the disengaging cams 42. Similar springs 53a can surround the end portions of the rolls 30, 31.

As mentioned above, the shaft 44 for the knob 43 is movable in an arcuate slot 54 of the casing 20 so as to enable an operator to move the carriage 34–37 between the two end positions. The shaft 44 carries a sheet metal shroud 55 which serves as a means for preventing entry of light via slot 54 and into the interior of the casing 20 irrespective of the angular position of the carriage 34–37.

The operation of the structure which is shown in the drawing, and more particularly of the developing unit 19, is as follows:

The operator (e.g., an amateur photographer who wishes to make enlarged prints of his or her own film frames) is preferably located (e.g., seated) at the left-hand side of the housing, as viewed in FIG. 1. The film is installed in the apparatus so that the foremost or the first selected film frame overlies the platform 5 which transmits light. The operator has inserted a cassette 14 with one or more film units 15 (or a single film unit 15) into the compartment 13 so that the single film unit or the foremost film unit in a cassette is located in the (predetermined) focal plane of the optical system 6. As explained above and also in the copending application Ser. No. 97,719 of Fergg et al., the topmost film unit 15 in the compartment 13 can be overlapped by a cover sheet or a plate whose white surface faces upwardly toward the optical system 6 and shields the film unit 15 therebelow against contact with light. This enables the operator to properly focus the image of the foremost or selected frame of the film 7 by opening the door 17 in the duct 16 and by rotating the knob 9 until he or she sees a sharp image of the film frame on the white surface in the positive plane. The cover sheet or plate is then removed in a manner not shown in the drawing, and the door 17 is closed. Removal of the plate or cover sheet is preceded by deactivation of the light source 2. The apparatus is then ready for the making of a first exposure, i.e., the light source 2 is turned on and the image of the film frame on the platform 7 is exposed onto the topmost film unit 15 in the compartment 13. The leader 15a' of the film unit 15 which is exposed to light extends into and beyond the opening 21 and into the relatively wide gap between the advancing rolls 38, 39 (the carriage 34–37 is held in the first end position which is shown in FIG. 2 by solid lines). The leader 15a' is actually the rightmost marginal portion of the upper or negative sheet 15a of the film unit 15. The rightmost portion or leader 15a' extends beyond the corresponding marginal portion of the somewhat shorter positive sheet 15b.

When the exposure is completed, the operator engages the knob 43 for the purpose of moving the carriage 34–37 from the solid-line to the broken-line position of FIG. 2. Thus, the operator needs not rotate the knob 43 but merely uses the knob as a means for pivoting the levers 34 and 35 about the axis of the shaft 33. The advancing roll 39 moves toward the advancing roll 38 as soon as the shaft 41 (or the peripheral surface of the roll 39) moves away from the faces of the cams 42, whereby the peripheral surfaces of the rolls 38, 39 pinch the leader 15a', preferably after a very small angular displacement of the roll 39 about the axis of the shaft 33 (in fact, the angular displacement may be so small that the roll 39 can move against the roll 38 after the shaft 41 completes a movement through a distance of a few millimeters). This insures that the leader 15a' needs not extend well beyond the sheet 15b of the respective film unit 15. The means for permanently urging the roll 39 toward the roll 38 includes the aforementioned endless cord springs 53. It goes without saying that other biasing means can be used with equal advantage. Such other biasing means may include discrete coil springs of finite length for the two end portions of the shaft 41, leaf springs, pneumatic biasing means and/or others.

When the carriage 34–37 reaches the broken-line position of FIG. 2, a substantial part of or the entire freshly exposed film unit 15 has been transferred into the casing 20. The rearmost portion of the separating device 27 (as considered in the direction of movement of a film unit 15 from the opening 21 toward the opening 22) engages the leader 15a' of the sheet 15a not later than when the carriage 34–37 reaches the second end position of FIG. 2. This simplifies the separation of sheets 15a, 15b preparatory to their transport through the respective channels 25A and 25B. The trailing end of the separating device 27 is slightly offset (to the right, as viewed in FIG. 2) with respect to the nip of the advancing rolls 38, 39 when the carriage 34–37 reaches the second end position, so that the leader 15a' is slightly flexed in a direction away from the foremost (lowermost) portion of the associated sheet 15b. In other words, the rear end of the separating device 27 is not in exact alignment with the discharge end of that portion of the U-shaped path for successive film units 15 which begins at the opening 21 and ends at the upper or rear end of the device 25. This invariably insures that the sheets 15a, 15b become separated from each other when the corresponding film unit 15 is caused to advance beyond the position which is shown in FIG. 2. Such advancement is effected by rotating the knob 43 so as to enable the rolls 38, 39 to advance the film unit 15 downwardly, whereby the sheets 15a, 15b respectively enter and advance in the channels 25A and 25B. The knob 43 also drives the other advancing rolls 30, 31, in a manner as described above in connection with FIG. 3, so that the rolls 30, 31 begin to expel the surplus of developing agent from the reunited sheets 15a, 15b before successive increments of the reassembled film unit 15 enter the diffusion chamber 19 below the compartment 13. The peripheral speed of the rolls 30, 31 preferably matches that of the rolls 38, 39, so that the sheets 15a, 15b are not damaged when the leader of the reassembled film unit 15 is engaged by the rolls 30, 31. The operator ceases to rotate the knob 43 when the introduction of the reunited sheets 15a, 15b into the chamber 19 is completed. The carriage 34–37 is thereupon returned to the solid-line (first end) position of FIG. 2, whereby the cams 42 separate the roll 39 from the roll 38 and the thus enlarged gap between the rolls 38, 39 is ready to receive the leader of the next film unit. The chamber 19 has a door 19A which can be opened to allow for removal of a film unit 15 after a certain interval of dwell of such unit in the space below the compartment 13. If desired, the chamber 19 can remain closed until it accumulates two or more developed film units 15. The sheets 15a, 15b of the film unit 15 which has been removed from the diffusion chamber 19 can be manually separated from each other.

It is normally desirable or advantageous (but not critical) to insure that the advancing rolls 38, 39 cannot become disengaged from the leader of a film unit 15 while the knob 43 is used to pivot the carriage 34–37 from the first to the second end position. Such disengagement could take place by allowing the rolls 38, 39 to respectively rotate clockwise and counterclockwise, as viewed in FIG. 2, while the lever 34 of FIG. 2 moves from the solid-line to the broken-line position. The means for preventing such rotation of the advancing rolls 38, 39 includes a blocking device 56 (e.g., a spring biased pawl) which cooperates with the roll 39 and/or shaft 41 to hold the roll 39 against rotation in a counterclockwise direction, as viewed in FIG. 2. The pawl can cooperate with a ratchet wheel on the shaft 41. The film units 15 can offer substantial resistance to extraction from the compartment 13 when the corresponding cassette 14 contains a substantial number of stacked film units and/or for other reasons when the foremost or topmost film unit frictionally engages the adjacent film unit, the adjacent cover sheet and/or a portion of the cassette 14, compartment 13 and/or casing 20 with a substantial force.

An important advantage of the improved apparatus is that it occupies a small amount of space in the home of an amateur photographer who desires to make enlarged prints of color films. The reduction in the dimensions of the apparatus is achieved by placing the diffusion chamber 19 below the compartment 13 and by using a relatively small casing 20 for the developing unit 18, wherein the direction of transport of successive film units 15 is reversed while the film units travel from the opening 21 toward the opening 22. The rolls 30, 31 and 38, 39 constitute two portions of a composite advancing means which transports successive film units 15 from the focal plane of the optical system 6 (i.e., from the interior of the cassette 14 in the compartment 13) into the diffusion chamber 19. Since the apparatus employs a diffusion chamber, a single vessel (24) suffices for storage of a single supply of liquid developing agent. This also contributes to compactness of the improved apparatus. The travel of successive film units along a substantially U-shaped path allows for a pronounced reduction of the width as well as the length of the developing unit. An advantage of the manually operated knob 43 (which can pivot the carriage 34-37 as well as rotate the rolls 30, 31, 38 and 39) is that this knob replaces customary electric motors, i.e., there is no need for conductors in the interior of the casing 20, so that the likelihood of danger to the operator is reduced because no current-consuming parts are installed close to the supply of liquid in the vessel 24 and/or 26.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. Apparatus for exposing and developing film units wherein two sheets overlap each other, comprising an exposing unit including means for supporting successive film units in a predetermined plane during exposure of such units to light; and a developing unit including advancing means, a carriage mounting at least a portion of said advancing means and including a lever, means for pivoting said lever about a predetermined axis between a first position in which said advancing means can engage a film unit located in said plane and a second position in which the thus engaged film unit is at least partially withdrawn from said plane, and a vessel containing a supply of liquid developing agent and being adjacent to said portion of said advancing means in said second position of said lever, said portion of said advancing means comprising two parallel rolls rotatably mounted on said lever.

2. The apparatus of claim 1, wherein said exposing unit further comprises a light source, a support for originals interposed between said source and said plane, and adjustable optical means for focusing the image of an original on said support upon the film unit in said plane.

3. The apparatus of claim 2, wherein said exposing unit further comprises filter means for light which issues from said source and passes through an original on said support prior to impinging upon the film unit in said plane.

4. The apparatus of claim 1, further comprising a diffusion chamber, said advancing means further including means for transporting successive film units through and beyond the supply of liquid developing agent in said vessel and into said chamber.

5. The apparatus of claim 1, wherein said rolls are adjacent to said plane in said first position and are disposed above said vessel in said second position of said lever.

6. The apparatus of claim 5, further comprising a housing including a first casing for said exposing unit, a compartment for film units below said first casing, and a second casing for said developing unit, said plane being located in said compartment and said second casing having a portion extending downwardly to a level below said compartment.

7. The apparatus of claim 1, further comprising a diffusion chamber for film units, said rolls being arranged to transport film units from said plane toward and through the developing agent in said vessel and said advancing means further comprising a second portion arranged to transport film units from said vessel into said chamber.

8. The apparatus of claim 2, wherein each portion of said advancing means comprises a pair of substantially parallel rolls.

9. Apparatus for exposing and developing film units wherein two sheets overlap each other, comprising an exposing unit including means for supporting successive film units in a predetermined plane during exposure of such units to light; a developing unit including advancing means, a carriage mounting at least a portion of said advancing means, means for moving said carriage between a first position in which said advancing means can engage a film unit located in said plane and a second position in which the thus engaged film unit is at least partially withdrawn from said plane, and a vessel containing a supply of liquid developing agent and being adjacent to said portion of said advancing means in said second position of said carriage; and a diffusion chamber for film units, said chamber being located below said plane and said advancing means comprising a first portion which is arranged to transport film units from said plane toward and through the developing agent in said vessel, a second portion arranged to transport film units from said vessel into said chamber and means for driving said portions in synchronism with each other.

10. Apparatus for exposing and developing film units wherein two sheets overlap each other, comprising an exposing unit including means for supporting successive film units in a predetermined plane during exposure of such units to light; and a developing unit including advancing means, a carriage mounting at least a portion of said advancing means, means for moving said carriage between a first position in which said advancing means can engage a film unit located in said plane and a second position in which the thus engaged film unit is at least partially withdrawn from said plane, and a vessel containing a supply of liquid developing agent and being adjacent to said portion of said advancing means in said second position of said carriage, said advancing means including means for moving successive film units in a first direction from said plane to said vessel and in a different second direction through the developing agent in said vessel.

11. The apparatus of claim 10, wherein said second direction is substantially counter to said first direction.

12. Apparatus for exposing and developing film units wherein two sheets overlap each other, comprising an exposing unit including means for supporting successive film units in a predetermined plane during exposure of such units to light; and a developing unit including advancing means, a carriage mounting at least a portion of said advancing means, means for pivoting said carriage about a fixed axis between a first position in which said advancing means can engage a film unit located in said plane and a second position in which the thus engaged film unit is at least partially withdrawn from said plane, and a vessel containing a supply of liquid developing agent and being adjacent to said portion of said advancing means in said second position of said carriage, said advancing means including a first portion mounted on said carriage and a second portion including two substantially parallel rolls, said fixed axis coinciding with the axis of one of said rolls.

13. Apparatus for exposing and developing film units wherein two sheets overlap each other, comprising an exposing unit including means for supporting successive film units in a predetermined plane during exposure of such units to light; and a developing unit including advancing means, a carriage mounting at least a portion of said advancing means, means for moving said carriage between a first position in which said advancing means can engage a film unit located in said plane and a second position in which the thus engaged film unit is at least partially withdrawn from said plane, said portion of said advancing means comprising two substantially parallel rolls one of which is movable sideways toward and away from the other of said rolls, said developing unit further comprising means for yieldably biasing said one roll toward said other roll, means for disengaging said one roll from said other roll in said first position of said carriage, and vessel containing a supply of liquid developing agent and being adjacent to said portion of said advancing means in said second position of said carriage.

14. The apparatus of claim 13, wherein said disengaging means is adjacent to said plane.

15. Apparatus for exposing and developing film units wherein two sheets overlap each other, comprising an exposing unit including means for supporting successive film units in a predetermined plane during exposure of such units to light; and a developing unit including advancing means, a carriage mounting at least a portion of said advancing means, means for moving said carriage between a first position in which said advancing means can engage a film unit located in said plane and a second position in which the thus engaged film unit is at least partially withdrawn from said plane, a vessel containing a supply of liquid developing agent and being adjacent to said portion of said advancing means in said second position of said carriage, said portion of said advancing means being arranged to transport film units along a predetermined path a portion of which starts at said plane and ends at said vessel and said developing unit further comprising means for separating the sheets of the film units in a second portion of said path which extends through said vessel, said separating means including a rear portion adjacent to and being laterally offset with respect to the end of said first portion of said path.

16. The apparatus of claim 15, wherein said portion of said advancing means includes a pair of substantially parallel rolls and said rear portion of said separating means is offset with respect to the nip of said rolls in said second position of said carriage.

17. Apparatus for exposing and developing film units wherein two sheets overlap each other, comprising an exposing unit including means for supporting successive film units in a predetermined plane during exposure of such units to light; and a developing unit including advancing means, said advancing means comprising two substantially parallel rotary advancing rolls, means for limiting the rotational movement of at least one of said rolls to a single direction, a carriage mounting at least a portion of said advancing means, means for moving said carriage between a first position in which said advancing means can engage a film unit located in said plane and a second position in which the thus engaged film unit is at least partially withdrawn from said plane, and a vessel containing a supply of liquid developing agent and being adjacent to said portion of said advancing means in said second position of said carriage.

18. Apparatus for exposing and developing film units wherein two sheets overlap each other, comprising an exposing unit including means for supporting successive film units in a predetermined plane during exposure of such units to light; and a developing unit including advancing means, a carriage mounting at least a portion of said advancing means, means for moving said carriage between a first position in which said advancing means can engage a film unit located in said plane and a second position in which the thus engaged film unit is at least partially withdrawn from said plane, a first vessel containing a supply of liquid developing agent and being adjacent to said portion of said advancing means in said second position of said carriage, a second vessel, a device for separating the sheets of a film unit during transport through the developing agent in said first vessel, and guide means defining with said device discrete channels for the separated sheets during transport through the developing agent.

19. The apparatus of claim 18, further comprising means for removing developing agent from film units leaving said supply at a level above said second vessel.

20. The apparatus of claim 19, further comprising a casing for said developing unit and a frame removably disposed in said casing and supporting said vessels, said separating device and said guide means.

* * * * *